(No Model.)  G. & A. RAYMOND.  6 Sheets—Sheet 1.
GRINDING MILL.

No. 348,585.  Patented Sept. 7, 1886.

WITNESSES
Sidney P. Hollingsworth
W. H. Shipley

INVENTORS
George Raymond
Albert Raymond
By Phil. T. Dodge, Atty.

(No Model.)  
6 Sheets—Sheet 4.

G. & A. RAYMOND.
GRINDING MILL.

No. 348,585. Patented Sept. 7, 1886.

on y–y on line z–z

WITNESSES  
INVENTOR  
George Raymond  
Albert Raymond  
By Phil T. Dodge (No Model.) 6 Sheets—Sheet 5.
G. & A. RAYMOND.
GRINDING MILL
No. 348,585. Patented Sept. 7, 1886.
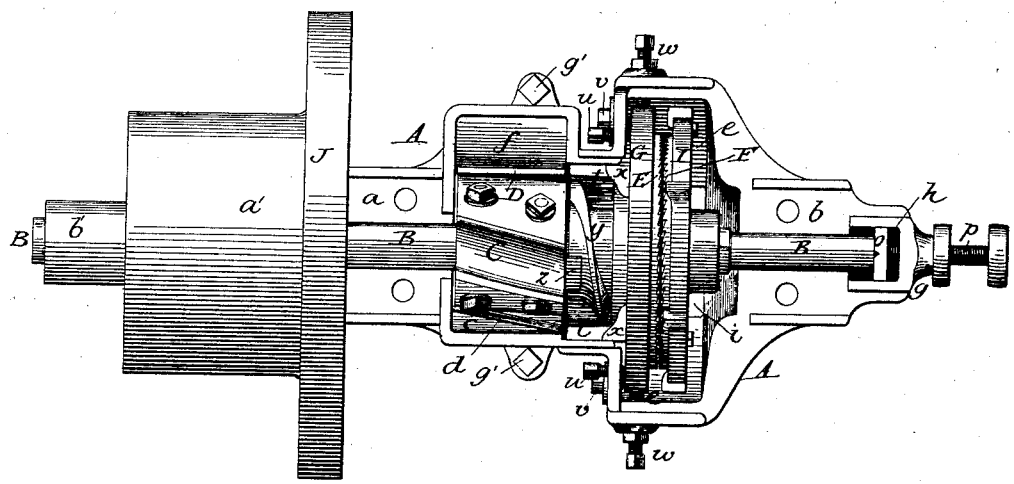

(No Model.)  
6 Sheets—Sheet 6.

G. & A. RAYMOND.
GRINDING MILL.

No. 348,585. Patented Sept. 7, 1886.

WITNESSES  
Sidney P. Hollingsworth  
W. H. Shipley

INVENTOR  
George Raymond  
Albert Raymond  
By Phil. T. Dodge.

N. PETERS, Photo-Lithographer, Washington, D. C.

UNITED STATES PATENT OFFICE.

GEORGE RAYMOND AND ALBERT RAYMOND, OF CHICAGO, ILLINOIS.

GRINDING-MILL.

SPECIFICATION forming part of Letters Patent No. 348,585, dated September 7, 1886.

Application filed March 24, 1885. Serial No. 159,966. (No model.)

*To all whom it may concern:*

Be it known that we, GEORGE RAYMOND and ALBERT RAYMOND, of Chicago, in the county of Cook and State of Illinois, have invented certain Improvements in Grinding-Mills, of which the following is a specification.

Our invention relates to a mill for cutting and grinding stalks, cane, corn on the ear, shelled corn, oats, and other materials, and has reference to a machine in which a horizontal shaft is provided with a cutter-head armed with knives or blades to co-operate with a stationary knife, and also with a grinding disk or burr operating in connection with a corresponding stationary disk.

The invention consists in various peculiarities of construction hereinafter described and claimed.

Figure 1:
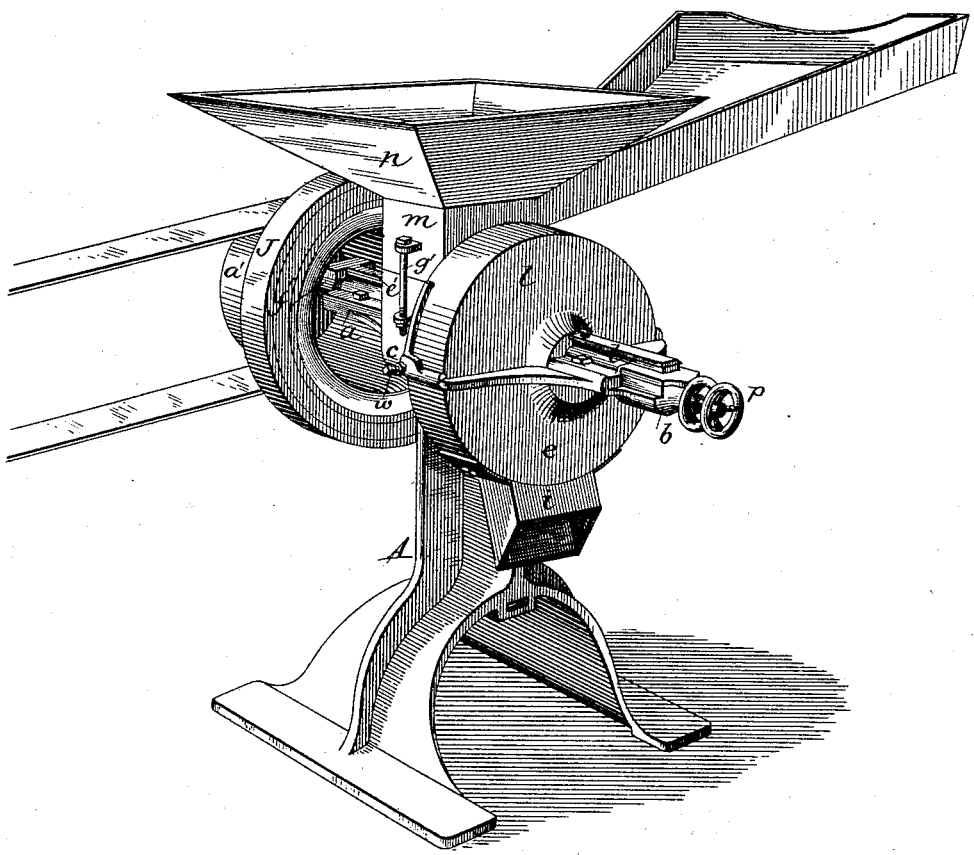
Figure 2:
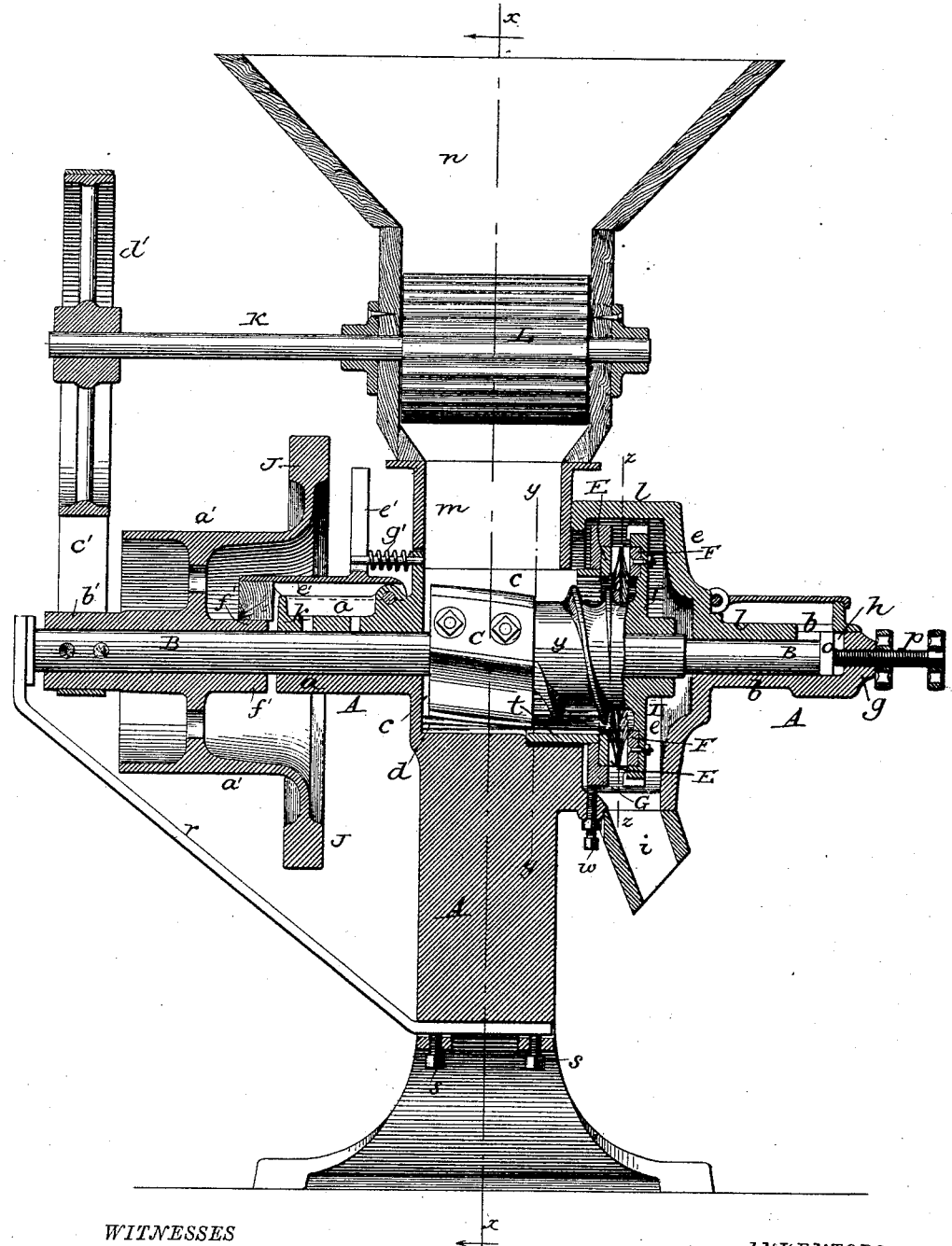
Figure 3:
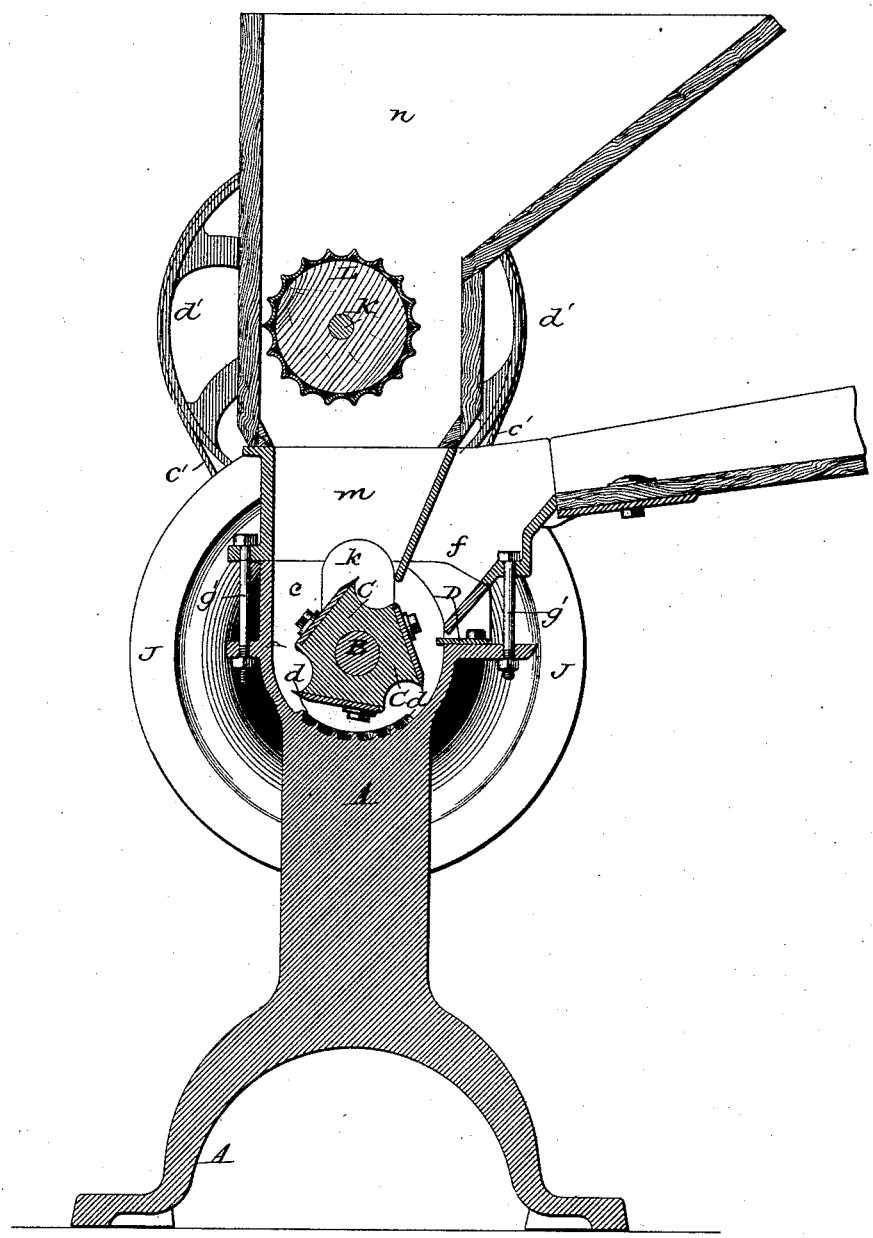
Figure 4:
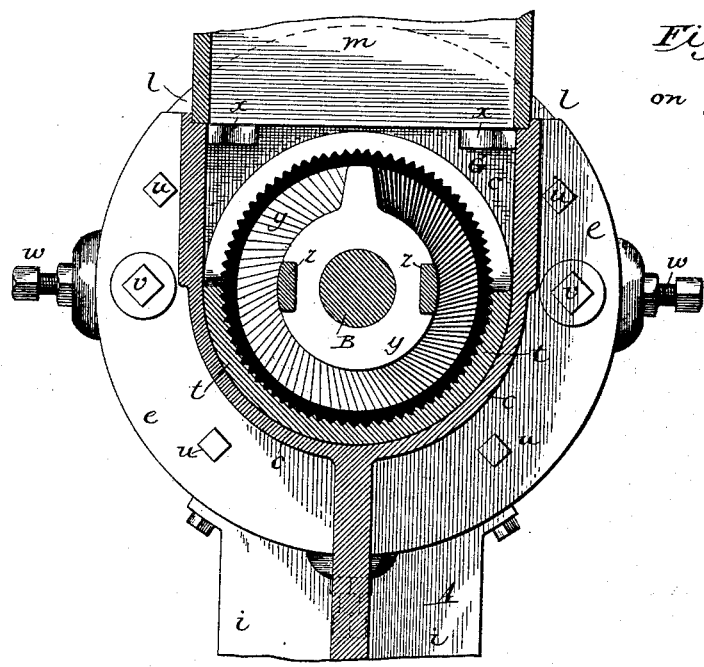
Figure 5:
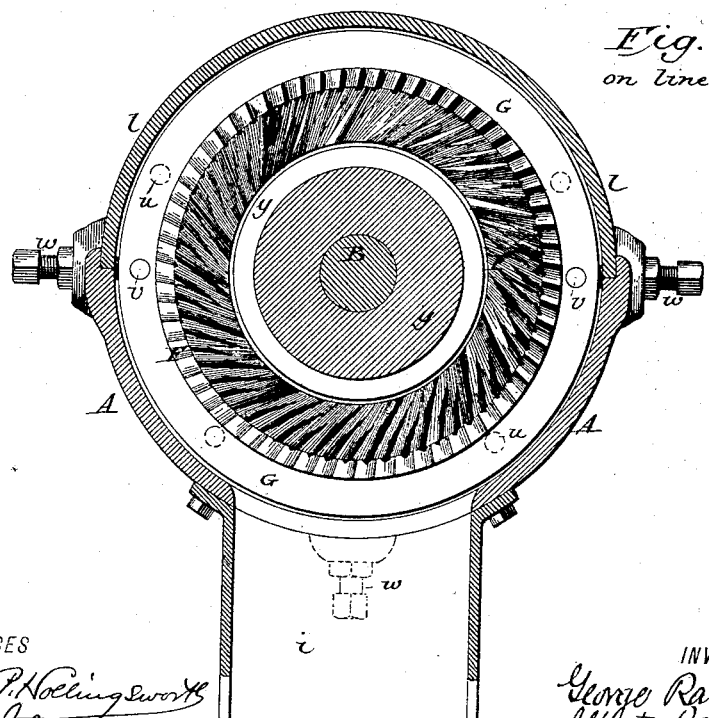
Figure 8:
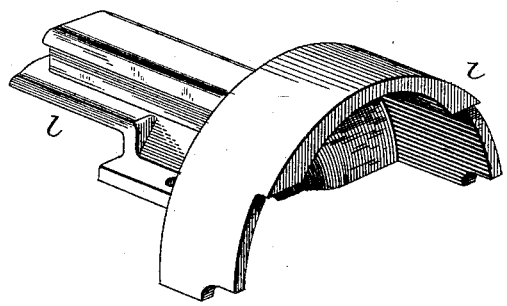
Figure 9:
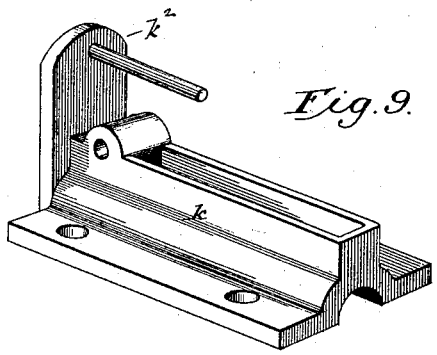
Figure 10:
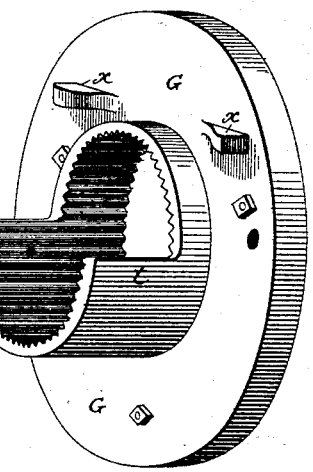
Figure 11:
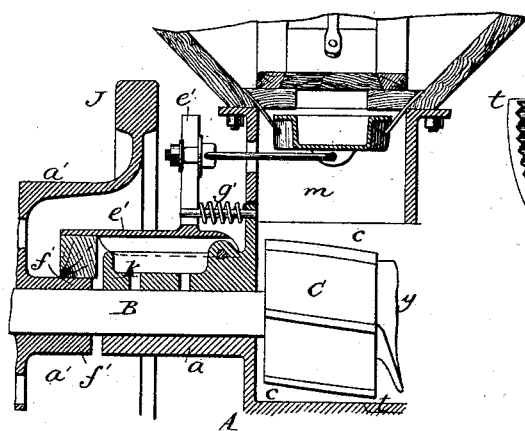

Referring to the accompanying drawings, Figure 1 represents a perspective view of our improved mill; Fig. 2, a vertical section of the same in the plane of the main shaft; Fig. 3, a cross-section on the line $x x$ of Fig. 2, looking in the direction indicated by the arrows. Fig. 4 is a vertical cross-section on the line $y y$, looking toward the grinding-disks. Fig. 5 is a vertical cross-section on the line $z z$. Fig. 6 is a top plan view with the tops of the cutting and grinding chambers removed. Fig. 7 is a top plan view of the lower or body portion of the main frame. Fig. 8 is a perspective view of the casting which forms the top portion of the grinding-chamber and the bearing-cap for one end of the main shaft. Fig. 9 is a perspective view of the bearing-cap for the opposite end of the main shaft, which also serves to form a portion of the cutting-chamber and a support for the feed-operating device. Fig. 10 is a perspective view of the inner grinding-disk, showing its extended toothed or serrated neck to co-operate with the feed-screw. Fig. 11 is a vertical section in the plane of the main shaft, showing the manner of operating the vibrating feed-shoe.

Referring to the drawings, A represents the base or body portion of the main frame, cast complete in a single piece, of the form represented in Figs. 1, 3, and 7. The lower portion or the pedestal may be of the form represented or of any other form adapted to sustain the upper portion in which the operative parts are mounted. Its upper portion is extended laterally to form bearings $a\ b$, to sustain the ends of the horizontal main shaft.

Adjacent to and inside of the bearing $a$ the body is fashioned, as shown, to form a cutting-chamber, $c$, the lower portion of which is semi-circular in vertical section with oblique ribs $d$ therein, as shown in Figs. 3 and 7, to hold the material against the cutting action of the rotary head hereinafter described. At one side of the cutting-chamber $c$ the top is extended to form a grinding-chamber, $e$, which is also of semicircular form in vertical section. The cutting-chamber $c$ is extended on one side to form a mouth or hopper, $f$, through which to introduce cornstalks, cane, ear-corn, and like materials. At one side the frame is extended beyond the bearing $b$ into an arm, $g$, which serves to receive and support the tempering-screw, by which the shaft is adjusted endwise. The grinding-chamber $e$ is provided with a discharge-throat at its lower side, and with a delivery-spout, $i$, bolted externally thereto, as shown in Fig. 5. A rectangular recess, $h$, is formed to receive an anti-friction plate, $o$, against which the end of the shaft bears.

From the foregoing it will be seen that the single frame-casting constitutes the support for the main shaft and the lower portions of the cutting and the grinding chambers. The top part of the frame consists of three principal pieces—a cast-metal cap, $k$, of the form shown in Fig. 9, which is bolted on top of the bearing $a$, to confine the main shaft, a casting, $l$, of the form shown in Fig. 8, which serves as a cap for the opposite end of the main shaft, and also as a case or shell to encircle the upper portion of the grinding-disks and form the top of the grinding-chamber, and, lastly, of an intermediate casting, $m$, in the form of a rectangular box or tube adapted to fit upon the cutting-chamber of the main frame and form an upward continuation thereof, as well as a support for the feed-hopper $n$, which is bolted to its top. The bearing $k$ is formed at one end with an upwardly-extending arm, $k^2$, as shown in Figs. 2 and 9, which closes a vertical slot formed in one side of the cutting-chamber, for the purpose of permitting the grinding-shaft to be lifted out of place when required. The casting $m$ is confined in place by means of two vertical bolts, $g'$, passed through its opposite sides and through ears on the sides of the base-frame, as represented in Fig. 3.

B represents the main shaft, seated horizontally in the bearing of the main frame, before described, and bearing at one end against the anti-friction plate $o$, which is acted upon by means of the tempering-screw $p$, the adjustment of which serves to move the shaft endwise and diminish the distance between the grinding-disks. The tempering-screw is provided with a jam-nut, to prevent its accidental movement. At the opposite end the main shaft bears against a spring-arm, $r$, which is extended downward into a socket at the lower part of the main frame, and acted upon, as shown in Fig. 2, by two screws, $s$, by means of which its tension may be regulated. This spring serves to urge the main shaft backward as the tempering-screw is released, so as to effect and maintain the separation of the grinding-disks. On the shaft we secure firmly within the cutting-chamber the rotary cutting-head C, consisting of a hub having peripheral blades or knives bolted thereto in an oblique or spiral position. These knives act in connection with a stationary blade or knife, D, inserted through a slot in one side of the main frame, and confined by bolts which admit of its being adjusted so as to stand in close proximity to the edges of the opposing knives, which act with a shearing effect to sever the stalks or other materials.

It will be observed that there are two throats or hoppers, one at the side of the mill for the introduction of stalks and other long material, and the other at the top for the admission of corn, oats, and similar material.

For the purpose of grinding the materials after partial reduction by the cutter-head, we make use of grinding-disks E and F. The stationary disk E is bolted into the recessed face of an annular supporting-plate, G, of the form represented in Fig. 10. This plate, which is seated vertically in the grinding-chamber, has a large central opening and a rearwardly-extending neck, $t$, of semicircular section. The neck extends backward into the cutting-chamber below the cutter-head, and is formed with spiral ribs or teeth, which co-operate with the feed-screw, hereinafter described, to cause the passage of the material from the cutter-head to the grinding-surface.

In order to secure the proper adjustment of the stationary disk, the supporting-plate G is seated at its back against four screws, $u$, tapped through the main frame, as shown in Figs. 4, 6, and 7. For the purpose of drawing the plate backward against these screws, two bolts, V, are inserted freely through slots in the frame, and threaded into the back of the plate G, as shown in Fig. 6. By the joint action of the advancing and retracting bolts the plate may be tipped or rocked as required, and maintained firmly in position.

To secure the adjustment of the plate in an edgewise direction, we provide three screws, $w$, tapped through the periphery of the grinding-chamber and bearing against the plate G, as shown in Figs. 6 and 7.

As a means of preventing the rotation of the plate G, we provide studs $x$ on its rear surface, as in Figs. 6 and 10, these studs engaging, as seen in Fig. 6, against the inner walls of the cutting-chamber.

The rotary grinding-disk F is bolted in the recessed face of a supporting-plate, I, which is bolted or otherwise secured firmly on the main shaft, as shown in Figs. 2 and 6. The plate I is provided on its forward side with a spiral-threaded hub or screw, $y$, which extends centrally through the two disks into the cutting-chamber, for the purpose of feeding the material from the cutter through the stationary disk to the grinding-surfaces. This feed-screw has its end notched or shouldered to interlock with the corresponding shoulder on the side of the cutter-head, as seen at $z$, Fig. 6, whereby the two are compelled to revolve in unison. The teeth formed on the rear extension of the plate G underlie the feed-screw and prevent the material from being revolved therewith, in consequence of which the screw has the effect of forcing the material positively forward to the grinders.

At one end the main shaft has secured firmly thereon a fly-wheel, J, one side of which is recessed or made concave to admit of the shaft-bearing $a$ extending therein, as shown in Figs. 1 and 2. This arrangement permits a long bearing to be employed, while, at the same time, the fly-wheel is brought close to the body of the machine, so that the latter may be of minimum width. On its outer side the fly-wheel has a driving-pulley, $a'$, cast thereon, and also a sleeve, $b'$, extending beyond the driving-pulley to receive a belt, $c'$, for imparting motion to the feed device.

In the cutting-chamber above the cutter-head we mount a horizontal shaft, K, provided with a drum, L, the surface of which is fluted longitudinally. This drum is arranged to revolve close to one side of the chamber, with a suitable feed throat or passage at its opposite side to admit of the material being delivered thereby from the hopper above to the cutter below. We prefer to construct the feed-drum, as shown, with a wooden body having corrugated plates screwed to its periphery. The feed-drum is driven by a pulley, $d'$, applied to its shaft and driven from the main shaft through the belt $c'$, before alluded to.

In grinding certain classes of material it is desirable to employ in the mouth of the upper hopper a reciprocating feed-shoe, such as represented in Fig. 11, substantially the same as those now in common use. To operate this shoe, we pivot to the casting $k$ an elbow-lever, $e'$, one end of which bears upon an eccentric, $f'$, formed on the inside of the fly-wheel, and the opposite end of which is acted upon by a spring, $g'$, tending to resist the movement of the arm by the eccentric. The manner in which this lever is connected with and arranged to actuate the feed device is plainly represented in Fig. 11.

In connection with the construction of our mill it is to be noted that the removal of the cap or casing *l* will expose to view both grinding-disks in such manner as to greatly facilitate their accurate adjustment with respect to each other.

Having thus described our invention, what we claim is—

1. The main frame having the cutting and grinding chambers therein and the shaft-bearings *a b*, in combination with the main shaft having the cutter-head, the feed-screw, and the grinding-disk thereon, the stationary grinding-disk, the plates *k* and *l*, and the central section, *m*, as described and shown.

2. In combination with the rotary grinding-disk and feed-screw, the stationary plate G, provided with the grinding-disk, and having the internally-ribbed extension *t*, underlying the feed-screw, as and for the purpose described.

3. The body provided with a cutting-chamber having the fixed plate D and the bottom ribs, *d*, in combination with the rotary cutting-head C, having peripheral plates, the feed-screw, the rotary grinding-disk, the stationary grinding-disk, and the disk-supporting plate G, having the tubular toothed extension *t*, encircling the feed-screw, as shown.

4. The main frame having the grinding-chamber therein and the shaft-bearing *b* thereon, in combination with the casting *l*, adapted, as shown and described, to confine the shaft and cover the grinding-disks.

5. In combination with the shaft provided with a grinding-disk, the spring-arm *r* and the two adjusting-screws *s*, acting upon said arm, substantially as described.

In testimony whereof we hereunto set our hands in the presence of two attesting witnesses.

GEORGE RAYMOND.
ALBERT RAYMOND.

Witnesses:
FREDERICK C. GOODWIN,
A. E. ARMITAGE.